US012647390B2

(12) United States Patent
Manickam et al.

(10) Patent No.: US 12,647,390 B2
(45) Date of Patent: Jun. 2, 2026

(54) SYSTEM AND METHOD FOR CONTENT TRANSFER TO AN AIR-GAPPED NETWORK

(71) Applicant: Honeywell International Inc., Charlotte, NC (US)

(72) Inventors: Muthuramalingam Manickam, Madurai (IN); Tholkappian Chandrasekaran, Madurai (IN); Prabhavathy Moorthisamy, Bangalore (IN); Prabhakaran Mahalingam, Madurai (IN)

(73) Assignee: Honeywell International Inc., Charlotte, NC (US)

( * ) Notice: Subject to any disclaimer, the term of this patent is extended or adjusted under 35 U.S.C. 154(b) by 37 days.

(21) Appl. No.: 18/929,657

(22) Filed: Oct. 29, 2024

(65) Prior Publication Data

US 2026/0122033 A1 Apr. 30, 2026

(51) Int. Cl.
*H04L 9/40* (2022.01)

(52) U.S. Cl.
CPC ...... *H04L 63/0218* (2013.01); *H04L 63/0861* (2013.01)

(58) Field of Classification Search
None
See application file for complete search history.

(56) References Cited

U.S. PATENT DOCUMENTS

| | | | | |
|---|---|---|---|---|
| 2023/0252168 A1* | 8/2023 | Savir | ..................... | H04L 9/3247 726/26 |
| 2023/0379349 A1* | 11/2023 | Hamilton | ............ | H04L 63/1433 |
| 2024/0007461 A1* | 1/2024 | Reed | ....................... | G06F 21/40 |
| 2025/0133117 A1* | 4/2025 | Alharbi | .................. | H04L 63/20 |

* cited by examiner

*Primary Examiner* — William J. Goodchild

(74) *Attorney, Agent, or Firm* — Schwegman Lundberg & Woessner, P.A.

(57) ABSTRACT

Systems and methods for content transfer to an air-gapped network 106 is provided to ensure that no malicious content is introduced into systems within the air-gapped network 106. The method includes performing by a first computing device 104, external to the air-gapped network 106, an initial operation on content received from an external source. Further, using a random sampling technique, a pair of approvers and a pair of appointees are selected from the air-gapped network's employee database by the first computing device 104. Further, an approval request may be sent to the pair of approvers, and upon receiving their approval, the content may transfer to a portable device from the first computing device 104. Further, a second computing device 108 within the air-gapped network 106 may verify the pair of appointees and conducts further checks on the content received from the portable device 210. If the verification is successful, the content may be transferred from the portable device 210 to storage within the air-gapped network 106.

20 Claims, 6 Drawing Sheets

200 ⌐
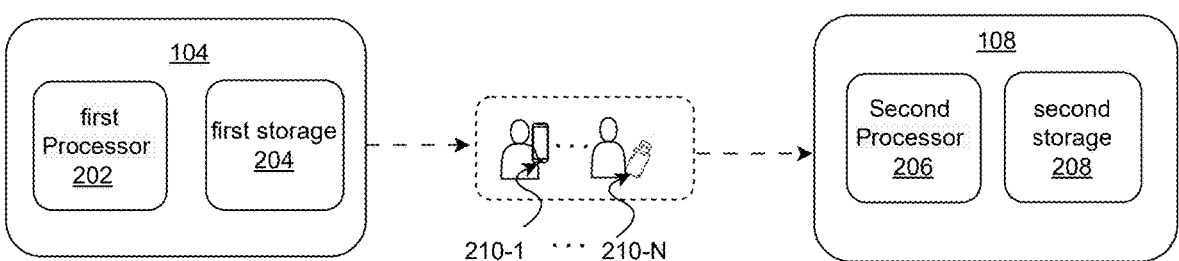
FIG. 2

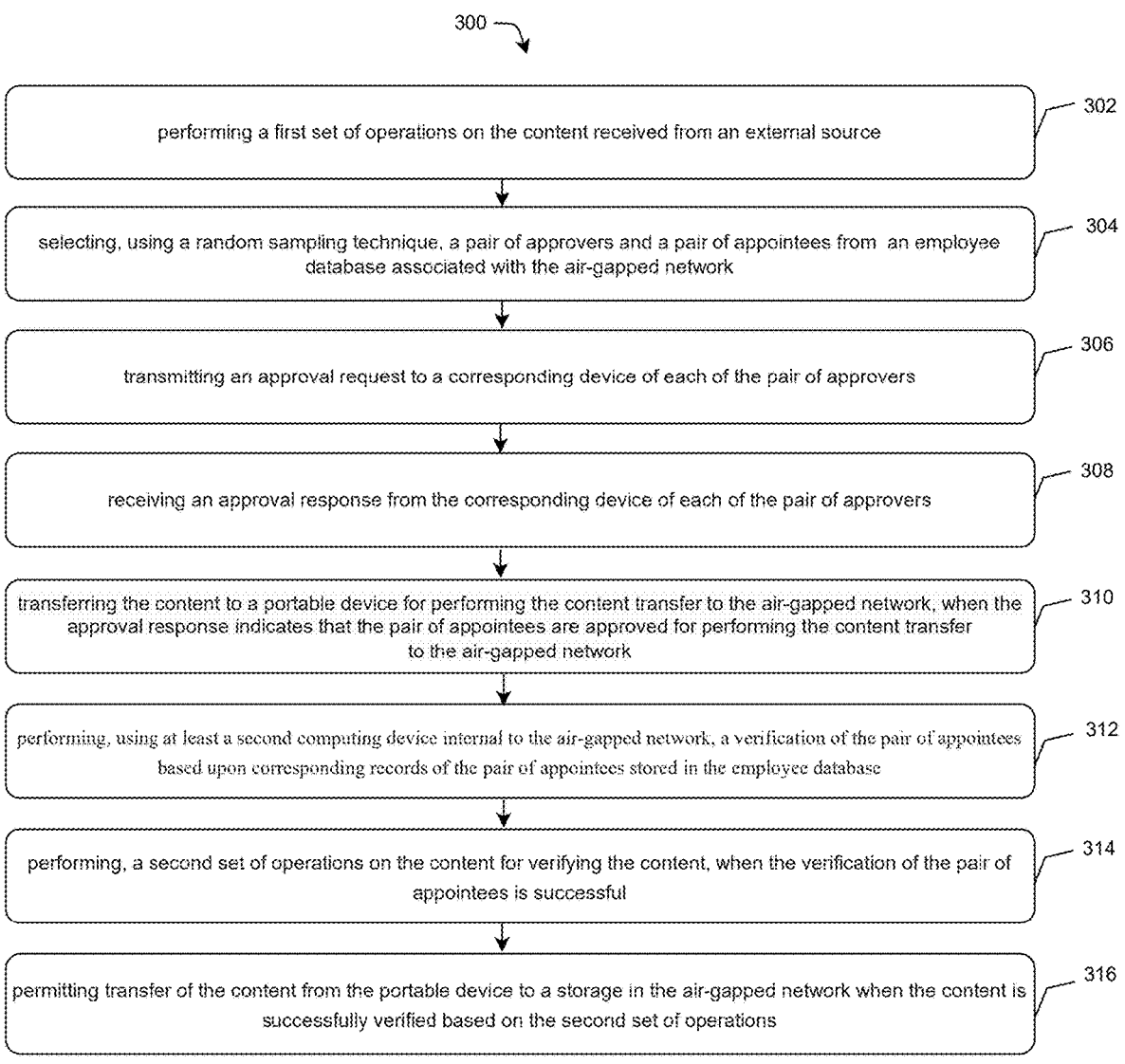

300 — performing a first set of operations on the content received from an external source — 302 selecting, using a random sampling technique, a pair of approvers and a pair of appointees from an employee database associated with the air-gapped network — 304 transmitting an approval request to a corresponding device of each of the pair of approvers — 306 receiving an approval response from the corresponding device of each of the pair of approvers — 308 transferring the content to a portable device for performing the content transfer to the air-gapped network, when the approval response indicates that the pair of appointees are approved for performing the content transfer to the air-gapped network — 310 performing, using at least a second computing device internal to the air-gapped network, a verification of the pair of appointees based upon corresponding records of the pair of appointees stored in the employee database — 312 performing, a second set of operations on the content for verifying the content, when the verification of the pair of appointees is successful — 314 permitting transfer of the content from the portable device to a storage in the air-gapped network when the content is successfully verified based on the second set of operations — 316

FIG. 3

400 verifying digital signature associated with the content received from the external source — 402 performing content scanning the content to check for presence of malicious content in the content, when the verifying is successful — 404 signing the content with a private key, when no malicious content is found in the content — 406

500 ⟍ performing an integrity check of the content using a public key associated with the private key with which the content was digitally signed in the first computing device    502 scanning the content to determine presence of malicious content in the content, when the integrity check is deemed successful    504

600

SYSTEM AND METHOD FOR CONTENT TRANSFER TO AN AIR-GAPPED NETWORK

TECHNICAL FIELD OF THE INVENTION

The present subject matter relates to air-gapped network-based deployments and, more particularly, to systems and methods to enable content transfer, ensuring that no malicious content is introduced into systems within the air-gapped network.

BACKGROUND OF THE INVENTION

To secure systems from malicious attacks, air-gapped network-based deployments are often used by various organizations. While air-gapped networks are generally considered more secure, they have become increasingly vulnerable due to several factors. One of the factors is insecure configurations, such as unintended connections between IT (Information Technology) and OT (Operational Technology) systems, create potential pathways for cyberattacks. IT systems, which are more likely to be exposed to external threats, can inadvertently serve as conduits for attacks on OT systems, leading to breaches in the infrastructure. Another vulnerability lies in outdated communication protocols used between IT and OT systems, which were not originally designed with modern cybersecurity in mind. Attackers can exploit these protocols to gain access to air-gapped systems, especially when encryption and secure communication practices are not in place. Additionally, insider threats present a significant risk to air-gapped networks, whether through malicious intent or accidental mistakes by employees or contractors with access to sensitive systems.

Securing air-gapped networks with the above vulnerabilities involves implementing solutions like strict access controls, encrypted communication protocols, network segmentation, and the use of data diodes for one-way data transfer, which can significantly reduce the risk of insider threats, unauthorized access, and vulnerabilities in IT-OT communications. However, these measures come with drawbacks. Stricter controls and enhanced monitoring can complicate operations, slow down workflows, and increase costs due to the need for specialized staff and tools. Encryption and data diodes can limit the flexibility of system updates and data transfers, while reliance on manual processes like removable media increases the potential for human error.

SUMMARY OF THE INVENTION

The present subject matter discloses systems and methods for content transfer to an air-gapped network ensuring that no malicious content is introduced into systems within the air-gapped network.

In an embodiment, a method of content transfer to an air-gapped network is disclosed. The method includes performing, using at least a first computing device external to the air-gapped network, a first set of operations on the content received from an external source. Further, the method includes selecting, using a random sampling technique, a pair of approvers and a pair of appointees from an employee database associated with the air-gapped network. Further, the method includes transmitting an approval request to a corresponding device of each of the pair of approvers. The method further includes receiving an approval response from the corresponding device of each of the pair of approvers. The method further includes transferring the content to a portable device for performing the content transfer to the air-gapped network, when the approval response indicates that the pair of appointees are approved for performing the content transfer to the air-gapped network. The method further includes performing, using at least a second computing device internal to the air-gapped network, a verification of the pair of appointees based upon corresponding records of the pair of appointees stored in the employee database. The method further includes performing, a second set of operations on the content for verifying the content, when the verification of the pair of appointees is successful. Further, the method includes permitting transfer of the content from the portable device to a storage in the air-gapped network when the content is successfully verified based on the second set of operations.

In some embodiments, performing the first set of operations on the content received from an external source includes verifying digital signature associated with the content received from the external source. Further, performing the first set of operations includes performing content scanning the content to check for presence of malicious content in the content, when the verifying is successful. Further, performing the first set of operations includes signing the content with a private key, when no malicious content is found in the content.

In some embodiments, the method includes defining, by the first computing device for each of the pair of appointees, a set of access control permissions, wherein the set of access control permissions specifies an access time period for performing the content transfer to the air-gapped network. Further, the method includes storing the set of access control permissions for each of the pair of appointees in a corresponding record in the employee database.

In some embodiments, verifying of the pair of appointees by the second computing device includes performing a facial match in real-time based on the corresponding record for each of the pair of appointees. Further, verifying of the pair of appointees includes determining whether a request for transferring the content to the storage is received within the accessible time period based on the corresponding record, when the facial match is successful.

In some embodiments, performing the second set of operations includes performing an integrity check of the content using a public key associated with the private key with which the content was digitally signed in the first computing device. Further, performing the second set of operations includes scanning the content to determine presence of malicious content in the content, when the integrity check is deemed successful.

In some embodiments, the method incudes generating, the key pair periodically by the first computing device, wherein the private key and the public key form a key pair. Further, the method includes storing the private key in the first computing device. The method further includes transmitting the public key to the second computing device.

In some embodiments, the method includes registering, by the first computing device, the portable device as an authorized device in an authorized devices database based on a device ID associated with the portable device. Further, the method includes authenticating, by the second computing device, the portable device based on the device ID of the portable device and the authorized devices database. Further, the method includes approving the portable device for use in the air-gapped network when the authenticating is deemed successful.

In another embodiment, a system for content transfer to an air-gapped network is provided. The system includes a first storage and a first processor provided in at least a first computing device external to the air-gapped network. The first processor is coupled to the first storage. The system further includes a second storage and a second processor provided in at least a second computing device internal to the air-gapped network. The second processor is coupled to the second storage. The first processor is configured to perform a first set of operations on the content received from an external source. Further, the first processor is configured to select, using a random sampling technique, a pair of approvers and a pair of appointees from an employee database associated with the air-gapped network. The first processor is also configured to transmit an approval request to a corresponding device of each of the pair of approvers. The first processor is also configured to receive an approval response from the corresponding device of each of the pair of approvers. The first processor is also configured to transfer the content to a portable device for performing the content transfer to the air-gapped network, when the approval response indicates that the pair of appointees are approved for performing the content transfer to the air-gapped network. Further, the second processor is configured to perform a verification of the pair of appointees based upon corresponding records of the pair of appointees stored in the employee database. The second processor is further configured to perform a second set of operations on the content for verifying the content, when the verification of the pair of appointees is successful. The second processor is further configured to permit transfer of the content from the portable device to the second storage in the air-gapped network when the content is successfully verified based on the second set of operations.

In yet another embodiment, a computer-readable medium having computer-executable instructions stored thereon is disclosed. The computer-executable instructions, when executed by a processing system, cause the processing system to perform a first set of operations on the content received from an external source wherein the verification is performed using at least a first computing device external to the air-gapped network. The computer-executable instructions further cause the processing system to select, using a random sampling technique, a pair of approvers and a pair of appointees from an employee database associated with the air-gapped network. Furthermore, the computer-executable instructions cause the processing system to transmit an approval request to a corresponding device of each of the pair of approvers. Further, the computer-executable instructions cause the processing system to receive an approval response from the corresponding device of each of the pair of approvers.

Further, the computer-executable instructions cause the processing system to transfer the content to a portable device for performing the content transfer to the air-gapped network, when the approval response indicates that the pair of appointees are approved for performing the content transfer to the air-gapped network. Further, the computer-executable instructions cause the processing system to perform a verification of the pair of appointees based upon corresponding records of the pair of appointees stored in the employee database, wherein the verification is performed using at least a second computing device internal to the air-gapped network. Further, the computer-executable instructions cause the processing system to perform a second set of operations on the content for verifying the content, when the verification of the pair of appointees is successful. Additionally, the computer-executable instructions cause the processing system to permit transfer of the content from the portable device to a storage in the air-gapped network when the content is successfully verified based on the second set of operations.

The proposed solution provides a way of transferring data into an air-gapped network, avoid insider attacks and prevents propagation of malicious file. Further, due to insecure data transfer to air-gapped networks, there are more chances of cyber-attacks which cause data loss, functionality loss, reputation damage, etc. The proposed methods and systems save critical infrastructures from them.

BRIEF DESCRIPTION OF DRAWINGS

Embodiments of the subject matter will hereinafter be described in conjunction with the following drawing figures, wherein like numerals denote like elements, and:

FIG. 2 is a schematic block diagram of the system for content transfer to an air-gapped network, according to one or more embodiments of the present disclosure.

FIG. 3 illustrates a flowchart of a method of content transfer to an air-gapped network, according to one or more embodiments of the present disclosure.

Figure 1:
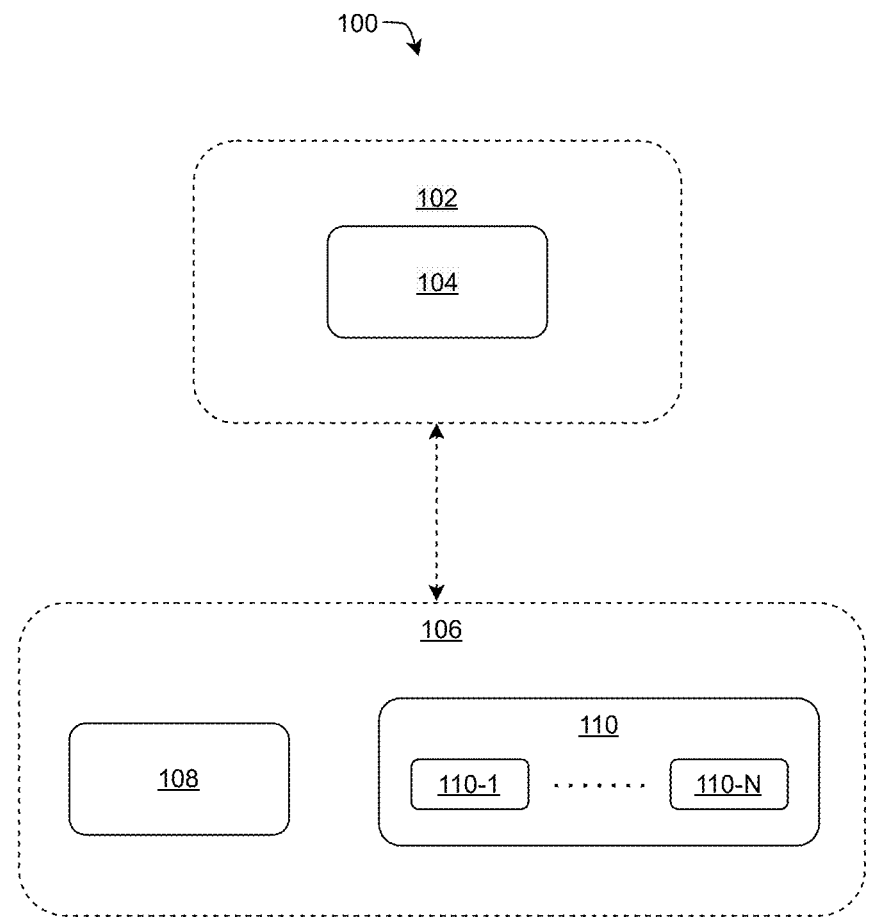
FIG. 1 illustrates an environment implementing a system for content transfer to an air-gapped network, according to one or more embodiments of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF INVENTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 illustrates an environment implementing a system 100 for content transfer to an air-gapped network, according to one or more embodiments of the present disclosure. In an embodiment, the environment may have the air-gapped network-based deployments for securing a plurality of devices comprised in the environment from the malicious attacks at the time of content transfer. In an example, the system 100 may be implemented by entities, such as enterprises, organizations, institutions, universities, campuses, etc., to ensure transfer of content such that no malicious content is introduced into the system 100 within the air-gapped network. Examples of content may include software update, configuration files, database, document, reports, multimedia content such as videos, images, or media files.

In an embodiment, the system 100 may be implemented by a service provider in order to enable content transfer the plurality of devices comprised in the air gapped network of the environment ensuring that no malicious content is introduced into systems within the air-gapped network. Herein, a subscription or a license to the services offered by the service provider may be taken by the organization. In an embodiment, the system 100 may be implemented locally at a site of the organization, i.e., within the environment. In an embodiment, the system 100 may be implemented as a cloud server or a cloud service. In some embodiments, the system 100's services may be offered as per a Software as a Service (Saas) model. In some embodiments, the system 100 may be implemented in any one of or a combination of the aforementioned implementation techniques to enable content transfer the plurality of devices comprised in the air gapped network of the environment ensuring that no malicious content is introduced into systems within the air-gapped network.

The system 100 may include a first computing device 104 connected to a network 102 and a second computing device 108 comprised in the air gapped network. Further, in an embodiment, a set of third computing devices 110 may be comprised within the air gapped network 106. Examples of the first computing device 104, second computing device 108 and the set of third computing devices 110 may include, but are not limited to, a desktop computer, a portable computing device, such as a laptop computer, a smartphone, a tablet device, and the like.

In an example, the network 102 may be outside the air-gapped network 106. The network 102 may be understood as a network, including personal computers, laptops, various servers and other computing devices. Further, the network 102 may be a wireless network, a wired network, or a combination thereof. The network 102 may also be an individual network or a collection of many such individual networks, interconnected with each other and functioning as a single large network, e.g., the Internet or an intranet. The network 102 may be implemented as one of the different types of networks, such as intranet, local area network (LAN), wide area network (WAN), the internet, and such. The network 102 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 102 may include network devices, such as network switches, hubs, routers, and Host Bus Adapters (HBAs) for providing a link between the first computing device 104 and devices in the air gapped network 106. The first computing device 104 within the network 102 may interact with the second computing device 108 and the set of third computing devices 110 through various secure communication links (not shown in the figure) such as using protocols like SFTP (Secure File Transfer Protocol) or FTPS (FTP Secure).

In some embodiments, the first computing device 104 may receive the content from an external network. In an example, the content may be an audio file, video file, document from the external network. In one embodiment, in the system 100, the first computing device 104 may be deployed in a server room (not shown in the figure) of the environment within the network 102. In an example, the external network may be the internet or any network outside the immediate or internal network 102 of the organization. In an embodiment, the server room may be a controlled environment where servers and other IT infrastructure pertaining to the environment are housed.

As mentioned above, the system 100 may be configured to perform content transfer to one or more devices implemented in the air gapped network 106. Accordingly, in an embodiment, when the content is received from the external network and is to be sent to a particular employee or worker in the organization which is part of the air gapped network, the content may not be directly sent to the employee or worker in the organization. In an embodiment, the content may undergo security checks and verification at different computing devices in the system 100 deployed in the organization. Firstly, the content may undergo security check for detecting presence of any malicious content therein and if found to be clean, may be signed with a security key at the first computing device 104 present in the network 102 outside the air gapped network 106.

Thereupon, the content may be transferred to a portable device (not shown in the figure) and handed over to at least two employees selected from amongst the plurality of employees in the organization. The process of selecting the employees to perform transfer of content from the first computing device 104 to the second computing device 108 via the portable device may be based on a specific criterion, which will be explained in detail later in the specification. Examples of the one or more portable device include, but are not limited to, USB flash drives, external hard drives, SD cards, portable solid-state devices (SSDs), smartphones or tablets, and optical discs, such as DVDs, CDs, etc.

In an embodiment, the second computing device 108 may be deployed within the air gapped network 106 and may be configured to perform one or more verification on the content received from the one or more portable devices. The verification of the content at the second computing device 108 is performed so as to further ensure that no malicious content may introduced within the air-gapped network 106. In an embodiment, the second computing device 108 may verify the content that has been secured at the first computing device 104, further ensuring that no malicious content may be introduced during the content transfer to the air-gapped network 106. Further, in an embodiment, the second computing device 108 may verify that the content secured at the first computing device 104 is free from malicious content before it is transferred from the portable device to the second computing device 108. This verification step may ensure that no malicious content may get incorporated within the air-gapped network 106 during the content transfer process from the portable device to the second computing device 108.

Upon successful verification of the content, the second computing device 108 may transmit the verified content to one or more computing devices 110 which are the recipient of the content. In an embodiment, the set of third computing devices 110 pertains to the plurality of employees working in the organization.

FIG. 2 is a schematic block diagram implementation 200 of the system 100 for enabling content transfer the plurality of devices comprised in the air gapped network 106 of the environment ensuring that no malicious content is introduced into systems within the air-gapped network 106, according to one or more embodiments of the present disclosure. In an embodiment, the system 100 includes the first computing device 104 and the second computing device 108. Further, in an embodiment, the first computing device 104 may include a first processor 202 and a first storage 204. In an embodiment, the first processor 202 provided in the first computing device 104 external to the air-gapped network 106. In an embodiment, the first processor 202 is coupled to the first storage 204. In an embodiment, the second computing device 108 may include a second processor 206 and a second storage 208. In an embodiment, the second processor 206 may be provided in the second computing device 108 internal to the air-gapped network 106. In an embodiment, the second processor 206 may be coupled to the second storage 208. Further, in an embodiment, the first computing device 104 and the second computing device 108 may be connected to one or more portable devices 210-1 to 201-N. In an embodiment, the one or more portable devices 210-1 to 201-N may be alternatively referred to as the portable device 210 in the specification. In an embodiment, the portable device 210 may be present with one or more selected employees of the organization deployed in the system 100.

The first processor 202 and the second processor 206, in some examples, may be implemented or realized as general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In some examples, the first processor 202 and the second processor 206 may be realized as microprocessors, controllers, microcontrollers, or state machines. In some examples, the first processor 202 and the second processor 206 may be realized as a combination of computing devices, such as, a combination of digital signal processors and microprocessors, a plurality of microprocessors, one or more microprocessors in conjunction with a digital signal processor core, or any other such combination/configuration. In some embodiments, one or more processors, such as the first processor 202 and the second processor 206 or equivalents thereof, may be provided for performing operations thereof, as described herein. In an embodiment, the first processor 202 may be implemented in the first computing device 104 and the first processor 202 may be implemented in the second computing device 108 in the system 100.

The first storage 204 and second storage 208 comprises one or more non-transitory computer-readable storage media, including but not limited to volatile storage media such as random-access memory (RAM), registers, cache, etc., as well as non-volatile storage media such as read-only memory (ROM), hard disk drives, solid-state drives, flash memory, optical storage devices, and so forth. Furthermore, the first storage 204 and second storage 208 may encompass computer-readable storage media that are distributed across a plurality of physical computing devices connected via a network, such as storage clusters within public, private, or hybrid cloud-based environments. In some embodiments, the first storage 204 and second storage 208 may be provisioned with software components that facilitate the system 100 in executing functionalities disclosed herein. These software components typically consist of program instructions executable by the processor 202 and 206 respectively, organized into software applications, virtual machines, software development kits, toolsets, or similar structures. Furthermore, the first storage 204 and second storage 208 may be configured to maintain data within one or more databases, file systems, or equivalent data structures. The first storage 204 and second storage 208 may also be implemented in other forms and/or configured to store data using alternative methods.

In some examples, the first storage 204 and second storage 208 may include the database related to the employees present in the environment where the system 100 may be deployed. In some examples, the first storage 204 may include a key pair having a primary and a secondary key used for the verification of the content receiving at the first computing device 104. In some examples, the second storage 208 may include the secondary key used for the verification of the content receiving at the second computing device 108.

Further, examples of one or more portable device 210 include but not limited to USB flash drives, external hard drives, SD cards, portable solid-state devices (SSDs), smartphones or tablets, optical discs such as DVDs, CDs, etc.

In an embodiment, for performing the security check on the content, the first processor 202 may be configured to perform a first set of operations on the content received from the external source. In an embodiment, the first set of operation include verifying digital signature associated with the content received from the external source. In an example, the first processor 202 may receive content along with a digital signature associated with the content. In one example, the digital signature may be created by the sender when the content is being originally sent. In an example, the sender of the content may provide a public key alongside the content for performing verification. Further, in an example, the first processor 202 may retrieve the public key from a trusted source, such as a public key server or a certificate authority (CA) for performing verification. In an embodiment, for verification of the signature, the first computing device 104 may use the public key to decrypt the digital signature, which was created by the sender using their private key.

Further, in an embodiment, the first set of operation include performing content scanning to check for presence of malicious content in the content, when the verification of digital signature is successful. In an example, the malicious content may be viruses, malware, or exploits. In an embodiment, the content scanning may be performed using a combination of one or more techniques to detect potential threats like malware, viruses, and malicious scripts. In an example, the content scanning may be performed using heuristic analysis to identify suspicious patterns that resemble malware behaviour. Further, in an example, the content scanning may be performed using behavioural analysis, running the content in a controlled environment or sandbox to observe if it performs any harmful actions.

Further, in an example, the content scanning may be performed using machine learning models to analyse the content by comparing it to previously detected threats, providing a higher level of detection for emerging or previously unknown malware. In an example, the first processor 202 may have may have antivirus software, email security systems, or web gateways for performing the content scanning.

Further, in an embodiment, the first set of operation may include signing the content with the private key, when no malicious content is found in the content. In an embodiment, after performing the content scanning, once it is verified that no malicious content is present in the content, the content may be signed with the private key at the first computing device 104 to avoid any content tampering. In an embodiment, the private key and the public key form the key pair. In an embodiment, the private key from the key pair is stored in first storage 204 of the first computing device 104 and may be used to sign the content. Further, the public key may be transmitted to the second computing device 108. As discussed later in the specification in detail, the second computing device 108 may use the public key to verify the authenticity of the signed content, confirming that it originated from the first computing device 104 holding the private key and has not been altered. In an embodiment, the public key may be transmitted to the second computing device 108 using the secure channel. Further, in an embodiment, the public key may be transmitted to the second computing device 108 prior to the initiation of the content receiving from the first computing device 104. In an embodiment, the public key may be transmitted to the second computing device 108 at the time of deployment of the system 100 in the environment or organization.

In an example, the keys may be created in advance and stored in the first storage 204 such as a Trusted Platform Module (TPM) or a Hardware Security Module (HSM) of the first computing device 104 to ensure that the keys are protected from unauthorized access or tampering. In an example, a plurality of algorithms may be used for generating the keys which may be one of Rivest-Shamir-Adleman (RSA), Elliptic Curve Cryptography (ECC), Digital Signature Algorithm (DSA).

In an embodiment, the first processor 202 may generate the key pair periodically at the first computing device 104. In an embodiment, there may be a plurality of method for deciding period for regeneration of the key pair. In an example, the key pair may be generated by setting fixed time intervals such as daily, weekly, monthly or yearly. Further, in an example, the keys may be regenerated after a certain number of operations or uses, for example, a new key pair is generated after signing 1,000 messages or content. Further, in an example, an operator or administrator at the first computing device 104 may manually trigger key pair regeneration based on the assessment of system security or specific needs. Further, in an example, the key pair may be regenerated in response to specific security events or triggers. For example, if the system 100 detects a potential security breach or compromise, the first computing device 104 may immediately regenerate a new key pair. In an implementation, a combination of two or more methods may be used to decide when to regenerate the key pair.

Subsequent to completion of the first set of operations at the first computing device 104, the first processor 202 may be configured to select a pair of approvers and a pair of appointees from an employee database associated with the air-gapped network 106 using a random sampling technique. In an embodiment, the employee database may be stored in the second computing device 108 deployed in the air-gapped network 106. In an embodiment, the employee database may be stored in the second storage 208 of the second computing device 108 deployed in the air-gapped network 106. In an embodiment, the employee database may be transmitted to the first computing device 104 deployed outside the air-gapped network 106 using the secure channel. In an example, the employee database may be transmitted to the first computing device 104 prior to the initiation of the content receiving from the first computing device 104. In an embodiment, the employee database may be transmitted to the first computing device 104 at the time of deployment of the system 100 in the environment or organization. Subsequent to the transfer of the employee database to the first computing device 104, the employee database may be stored in the first storage 204 and the first processor 202 may traverse the employee database for performing selection of pair of approvers and the pair of appointees from said employee database.

In an embodiment, the employee database may comprise the information related to the plurality of employees working in the organization where the system 100 is deployed. In an example, the employee database may include personal information of each of the employee such as full name, date of birth, contact details, identification information of each of the employee such as employee ID, biometric data such as fingerprints, retina scans, or other biometric information for secure access control, employment information such as job title and department, the employee's role and the division within the organization, employment start date, access level, background check status, work history and performance, etc.

In an example, the pair of appointees may be the employees selected from amongst the plurality of employees for performing the content transfer from the first computing device 104 to the second computing device 108. In an example, the pair of approvers may be the employees selected from amongst the plurality of employees for providing approval on the selected pair of appointees selected by the first processor 202. In an example, the selected pair of approvers may provide approval on the selected pair of appointees based upon a marker-checker authorization principle.

Subsequent to completion of the selection of the pair of appointees and the pair of approvers, the first processor 202 may transmit an approval request to a corresponding device of each of the pair of approvers in the air gapped network. In an embodiment, the approval request may be transmitted to the corresponding device of each of the pair of approvers using the secure channel. In an embodiment, the corresponding devices of the selected approvers where the devices are amongst the third set of computing devices 110 deployed inside the air-gapped network 106.

The pair of approvers may provide approval to the pair of appointees upon evaluating the information of the pair of appointees available to the pair of approvers. In an embodiment, each of the approvers may individually provide an approval for each of the two selected appointee. In an example, each of the approvers may provide the approval for each of the appointees based upon a predefined checklist. The checklist may include criteria such as rank and authority of the appointees, security clearance of the appointees, history of the appointees in terms of any escalation, period of association of the appointees with the organization, past work experience, profile of the appointee, etc. In an embodiment, the checklist may be predefined by the first processor 202. In an embodiment, the system 100 may be trained for the plurality of environments. Accordingly, the predefined checklist may be dependent upon the environment where the system 100 may be deployed. Further, in an example, each of the approvers may provide the approval for each of the appointee based upon random technique.

Further, in an embodiment, the first processor 202 may employ a parallel approval from both the approvers. For example, both the approvers review one appointee at a time and the appointee may be approved only when both the approvers approve. The first processor 202 may then enable both the approvers to approve the second appointee with the above same process. In an embodiment, in case any of the two approvers may not approve first appointee, the first processor 202 may reselect a pair of approvers and a pair of appointees from the employee database associated with the air-gapped network 106 using the random sampling technique without going forward with the second appointee. Further, in an embodiment, the first processor 202 may only reselect a pair of appointees from the employee database associated using the random sampling technique in case the two approvers may not approve first appointee without going forward with the second appointee.

Further, in an embodiment, the first processor 202 may employ a sequential approval. For example, first approver approves first appointee out of the two and once the first approver approves the first appointee, the second approver review and approve the approved first appointee. In one embodiment, in case when the first approver may not approve the first appointee, the first processor 202 may reselect a pair of approvers and a pair of appointees from the employee database associated using the random sampling technique without going forward with the approval by the second approver. Further, in an embodiment, the first processor 202 may reselect a pair of appointees only from the employee database using the random sampling technique when the first approver may not approve the first appointee without going forward with the approval by the second approver.

In an embodiment, the first approver and the second approver from the pair of approvers, the first appointee and the second appointee from the pair of appointees may be selected by the first processor 202 using the random sampling technique. Once approved by the pair of approvers, the first processor 202 may receive an approval response from the corresponding device of each of the pair of approvers. The approval response may indicate that the pair of appointees are approved for performing the content transfer from the first computing device 104 to the second computing device 108 in the air-gapped network 106.

In an embodiment, the first processor 202 may be configured to define for each of the pair of appointees, a set of access control permissions. In an example, the set of access control permissions specifies an access time period for performing the content transfer to the air-gapped network 106. Further, in an example, the set of access control permissions may specify access control permission to the pair of appointees to access one or more security zones of the organization required for performing content transfer. Further, in an example, the set of access control specifies access control permission to the pair of appointees to access second computing device 108 internal to the air-gapped network 106 of the organization. Further, the first processor 202 may store the set of access control permissions for each of the pair of appointees in a corresponding record in the employee database. In an embodiment, the updated employee database may be transmitted to the second computing device 108 deployed inside the air-gapped network 106 using the secure channel.

Further, in an embodiment, the first processor 202 may be configured to send a message to a corresponding device of each of the selected appointees for performing the content transfer. In an embodiment, the message may be transmitted from the first computing device 104 to the corresponding devices of the selected appointees using the secure channel, wherein the computing devices may be amongst the third set of computing devices 110 deployed inside the air-gapped network 106. In an example, the message may be a voice message, text message, an email, etc. In an example, the message may be an encrypted message. Further, in an example, the message may be indicative of details of the portable device 210 to be used for performing the content transfer. Further, in an example, the message may be indicative of details of the location where the portable device 210 may be available for performing the content transfer. Further, in an example, the message may be indicative of details of the access time period for the appointee to perform the content transfer.

Upon receiving the message for performing the content transfer, the selected appointees may procure the portable device 210 from the designated location specified in the message. In an example, the designated location may be present in any of the security zones of the organization. In an example, the selected appointees may have permission to access said security zone. Post getting the portable device 210, the selected pair of appointees may connect the portable device 210 with the first computing device 104 to transfer the content to the portable device 210 for performing the content transfer to the air-gapped network 106.

In an embodiment, the first processor 202 may be configured to register the portable device 210 as an authorized device in an authorized devices database based on a device ID associated with the portable device 210. In an example, the authorized devices database may be stored in the first storage 204. In an embodiment, updated database related to the authorized devices may be transmitted to the second computing device 108 using the secure channel.

Post processing the content received at the first computing device 104 deployed outside the air gapped network, the secured content may be transferred to the portable device 210. In an embodiment, the pair of appointees may now connect the portable device 210 to the second computing device 108 deployed inside the air-gapped network 106 to verify the secured content. Post verification at the second computing device 108, the content may be transmitted to the intended computing devices 110 in the air gapped network, if the content gets verified.

In an embodiment, each of the pair of appointees may request for login into the second computing device 108 for transferring the content to the second storage 208. In an example, the each of the pair of appointees may request for login into the second computing device 108 by directly inserting the portable device 210 in the second computing device 108. Upon detecting the new device insertion, the second processor 206 may configured to authenticate the portable device 210 based on the device ID of the portable device 210 and the authorized devices database. In an example, the device ID of the portable device 210 and the authorized devices database may be present in the second storage 208 of the second computing device 108. Further, in an embodiment, the second processor 206 may approve the portable device 210 for use in the air-gapped network 106 when the authenticating is deemed successful. In an example, for the successful authentication of the portable device 210, inserted portable device 210 may be present in the authorized devices database of the second computing device 108. Further, the device ID of the inserted portable device 210 should be same with the device ID of the matched portable device 210 in the authorized devices database of the second computing device 108. In case if either the portable device 210 is not present in the authorized devices database of the second computing device 108 or there is device ID mismatch, the second processor 206 may restrict the content transfer from the inserted portable device 210 to the second computing device 108 in the air-gapped network 106.

In an embodiment, in case of successful authentication of the portable device 210, the second processor 206 may be configured to perform a verification of the pair of appointees based upon corresponding records of the pair of appointees stored in the employee database. In an example, the second processor 206 may retrieve the details of the pair of appointees from the second database 208.

In a further embodiment, as soon as the portable device 210 may get authenticated, the second processor 206 may be configured to perform verification of the pair of appointees. In an embodiment, the second processor 206 may perform the verification for each of the pair of appointees in real time. In an embodiment, the second processor 206 may provide an input interface for the pair of appointees to enter their username and passwords. The inputted username and passwords of each of the pair of appointees may be matched with the corresponding record for each of the pair of appointees in the employee database present in the second storage 208. Post above authentication, in an embodiment, the second processor 206 may activate the camera (not shown in the figure) of the second computing device 108 for further verification of each of the pair of appointees. The captured image of each of the pair of appointees may be matched with the corresponding record for each of the pair of appointees in the employee database.

In an example, the second processor 206 may activate the iris scanner (not shown in the figure) of the second computing device 108 to perform iris scan of each of the pair of appointees. The captured iris scanner of each of the pair of appointees may be matched with the corresponding record for each of the pair of appointees in the employee database. Further, in an example, the second computing device 108 may be connected with a fingerprint scanner (not shown in the figure) to perform the biometric verification of the pair of appointees. The second processor 206 may compare the captured fingerprints with the corresponding record for each of the pair of appointees in the employee database.

In case of failure of the verification for either of the two appointees, the second processor 206 may restrict the content transfer from the inserted portable device 210 to the second computing device 108 in the air-gapped network 106.

In an embodiment, upon successful verification of each of the pair of appointees, the second processor 206 may determine whether a request for transferring the content to the second storage 208 may be received within the accessible time period. The second processor 206 may retrieve the details of accessible time period from the corresponding database of the pair of appointees. In an embodiment, the time for making the request for content transfer to the second storage 208 may be considered as the time when the portable device 210 may be inserted into the second computing device 108. In an example, the second processor 202 may retrieve the time when the portable device 210 was inserted from a device manager or timestamps in the registry of the computing device 106. In an embodiment, if the second processor 206 may determine that the time of request for content transfer was beyond the accessible time period, the second processor 206 may restrict the content transfer from the inserted portable device 210 to the second computing device 108 in the air-gapped network 106.

Subsequent to verification of the pair of appointees and the portable device 210, the second processor 206 may be configured to performed a second set of operations on the content for verifying the content. In an embodiment, the second set of operations includes performing an integrity check of the content using the public key associated with the private key with which the content was digitally signed in the first computing device 104. The second processor 206 may retrieve the public key from the second storage 208 for verifying the content. In an example, the content was digitally signed in the first computing device 104 for securing the content with the private key where the private key forms a part of the key pair. In an embodiment, the public key which forms the second part of the key pair may be transmitted to the second computed device 106 through a secure channel. The public key may be used to verify the content which was signed by its corresponding private key. In case of failure of the integrity check, the second processor 206 may restrict the content transfer from the inserted portable device 210 to the second computing device 108 in the air-gapped network 106.

In an embodiment, upon successful integrity check of the content, the second set of operations includes performing scanning the content to determine presence of malicious content in the content. In an example, the malicious content may be viruses, malware, or exploits. In an embodiment, the content scanning may be performed using a combination of one or more techniques to detect potential threats like malware, viruses, and malicious scripts. In an example, the content scanning may be performed using heuristic analysis to identify suspicious patterns that resemble malware behaviour. Further, in an example, the content scanning may be performed using behavioural analysis, running the content in a controlled environment or sandbox to observe if it performs any harmful actions. Further, in an example, the content scanning may be performed using machine learning models to analyse the content by comparing it to previously detected threats, providing a higher level of detection for emerging or previously unknown malware. In an example, the second processor 206 may have may have antivirus software, email security systems, or web gateways for performing the content scanning.

Further, in an embodiment, when the content is successfully verified based on the second set of operations, the second processor 206 may permit transfer of the content from the portable device 210 to the second storage 208 in the air-gapped network 106. Subsequently, the content may be transferred to the intended devices from amongst the plurality of devices 110 in the air gapped network.

FIG. 3 illustrates a flowchart of a method 300 for content transfer to an air-gapped network 106, according to one or more embodiments of the present disclosure. The steps of the method 300, described in connection with the embodiments disclosed herein, may be embodied directly in hardware, in firmware, in a software module executed by a system, such as a system 100, or in any practical combination thereof. In some embodiments, the method 300 may be implemented by the system 100 deployed in an environment such as enterprises, organizations, institutions, universities, campuses, etc., to ensure transfer of content such that no malicious content is introduced into the system 100 within the air-gapped network 106.

In the method 300, at step 302, a first set of operations on the content received from an external source may be performed. In an example, the external source may be a cloud storage services such as google drive, drop box, Microsoft OneDrive. Further, in an example, the external source may be an email server. Further, in an example, the external source may be USB Drives such as external USB drives brought in by employees or vendors. Further, in an example, the external source may be third-party applications for providing data feeds or reports, such as analytics tools. Further, in an example, the external source may be API Data Feeds such as APIs that provide real-time intelligence updates. In an example, the content may include satellite imagery drone surveillance data, software updates, reports, database, multimedia files, etc.

In an embodiment, the first set of operations on the content may be performed to check whether the content received from the external source have any malicious content. Further, in an embodiment, the first set of operations may be performed to secure the content received from the external source followed by checking the content for the malicious content. In an example, the first set of operations may be performed using at least a first computing device 104 external to the air-gapped network 106.

Subsequent to performing the first set of operation on the content, in the method 300, at step 304, selecting a pair of approvers and a pair of appointees from an employee database associated with the air-gapped network 106. In an embodiment, the pair of approvers and the pair of appointees may be amongst the employees working in the environment where the system 100 is deployed for performing the content transfer. In an example, the selection of the pair of approvers and the pair of appointees may be performed using the first computing device 104 external to the air-gapped network 106.

In an embodiment, the pair of approvers and the pair of appointees may be selected using a random sampling technique. In one example, a simple random sampling technique may be used where every individual in the employee database has an equal chance of being selected. For example, a random number generator may be used to pick IDs from the employee database. If there are 100 employees, the simple random sampling technique may generate four random numbers between 1 and 100. The first two numbers represent the approvers, and the last two represent the appointees.

Further, in an example, a systematic sampling technique may be used wherein every nth individual from the employee database may be selected after randomly choosing a starting point. For example, a sampling interval say every 10th employee may be determined After randomly selecting a starting employee (say ID 5), systematic sampling technique may select every 10th employee (IDs 5, 15, 25) until you have two approvers and two appointees.

Further, in an example, a weighted random sampling technique may be used wherein different probabilities may be assigned to different employees based on criteria like experience or rank. For example, in the weighted random sampling, a criterion may be set that affect selection probability. For example, if senior employees are preferred as approvers, assign them higher probabilities in the random selection process and a weighted algorithm may be used to choose two approvers and two appointees accordingly.

Further, in an example, a stratified sampling technique may be used where the employees may be divided into subgroups and sample from each group. For example, relevant strata may be identified from the employee database, such as departments or job roles. If the database has employees from IT, HR, and Finance, randomly select one approver from each department and one appointee from each department, ensuring a balanced selection.

In an embodiment, the employee database may have included information such as Employee ID, Name, Role/Position, Access Level and Approval Authority for each of the employees. In an embodiment, the random sampling technique may be used to select the pair of approvers wherein the random sampling technique may ensure that the pair of approvers have the necessary authority to approve the content transfers. For example, a random number generator may select two unique Employee IDs from those marked with "yes" in the Approval Authority column corresponding to the employees in the employee database. Assuming the random numbers generated are for employees say with Employee IDs 001 and 004 and the selected approvers may be for example, David (Network Admin) and the Alice (Project Manager). Similarly, the pair of appointees may be selected using the same random sampling technique. In an example, the appointees are the employees may be authorized to perform the content transfer, but they may not necessarily have approval authority. For example, from the employee database, select two unique Employee IDs that do not require approval authority. If the random numbers generated are for say Employee IDs 002 and 003, the selected appointees may be Davis Smith (Security Officer) and Carol (Data Analyst).

Once the pair of appointees and the pair of approvers may get selected, in the method 300, at step 306, transmitting an approval request to a corresponding device of each of the pair of approvers. In an example, the approval request may include details of each of the two appointees for authorizing them to enable the content transfer. In an embodiment, the approval request may also include employee database of each of the pair of appointees. Further, in an embodiment, the approval request may also include a predefined checklist for each of the approvers to authorize the pair of appointees based upon said predefined checklist. Further, in an embodiment, the approval request may include an instruction for each of the approvers to authorize the pair of appointees based upon a random sampling technique. In an embodiment, the first computing device 104 may transmit the approval request to the corresponding device of each of the pair of approvers from amongst the plurality of third computing devices 110 in the air gapped network. In an embodiment, the approval request may be transmitted to the corresponding device of each of the pair of approvers using a secure channel.

In an embodiment, the approval request may be sent to an email ID associated with each of the two approvers. The email IDs may be stored in the employee database corresponding to each of the employees which may include approvers and appointees. Further, in an embodiment, the approval request may be sent using an In-App notification. For example, in the secure channel, the plurality of third computing devices 110 may be using particular application. Accordingly, the computing devices 110 associated with the pair of approvers may receive an alert regarding the approval request within the application in real time.

In an embodiment, the pair of approvers may either approve the pair of appointees or may not approve the pair of appointees based upon the fulfilment of the criteria outlined above. Accordingly, the pair of approvers may send approval response to the first computing device 104.

In the method 300, at step 308, an approval response from the corresponding device of each of the pair of approvers may be received. In an embodiment, the corresponding device of each of the pair of approvers may transmit the approval response to the first computing device 104. In one embodiment, the approval response may indicate that the pair of appointees are approved for performing the content transfer from the first computing device 104 to the second computing device 108 in the air-gapped network 106.

In an embodiment, the approval response from the corresponding device of each approver must be received within a specified time interval. In some examples, the time interval may be a preset duration defined by the first computing device 104. The preset time may begin when the approval request is sent to each of the two approvers and ends when the approval response is received by the first computing device 104. For example, the preset time may be 15 minutes from the time the approval request may be transmitted to the approvers. A timestamp marking the exact time the approval request sent may be stored by the first processor 202 in the first computing device 104. In an embodiment, if the approval response may not receive within the preset time, the first computing device 104 may reselect a new pair of approvers from the employee database associated with the air-gapped network 106. Further, in an embodiment, if the approval response may not receive within the preset time, the first computing device 104 may reselect a pair of approvers and a pair of appointees from the employee database associated with the air-gapped network 106.

In an embodiment, if either of the two approvers may not approve any of the two appointees, there may be either reselection of the pair of approvers or the pair of appointees or any one of the approvers from the pair of approvers or any one of the appointees from the pair of the appointees or any combination of the above. The reselection may be performed from the employee database associated with the air-gapped network 106 using the random sampling technique as discussed in detailed description of FIG. 2.

For example, if one of the approvers may sent the approval response to the first computing device 104 for one appointee within the specified time interval. However, said one of the approvers may not sent the approval response for the other appointee within the specified time interval. The first computing device 104 may consider that said appointee was not approved by the said one of the approvers and hence the first computing device 104 may initiate performing the reselection of the pair of approvers or the pair of appointees or any one of the approvers from the pair of approvers or any one of the appointees from the pair of the appointees or any combination of the above.

Once the approval response is received for both the appointees within the specified time interval from the pair of approvers, a message may be sent to corresponding devices of each of the approved pair of appointees for performing the content transfer. In an embodiment, the message may be transmitted from the first computing device 104 to the corresponding devices of the selected appointees using the secure channel, wherein the computing devices may be amongst the third set of computing devices 110 deployed inside the air-gapped network 106. In an example, the message may be a voice message, text message, an email, etc. In an example, the message may be an encrypted message. Further, in an example, the message may be indicative of details of the portable device 210 to be used for performing the content transfer. Further, in an example, the message may be indicative of details of the location where the portable device 210 may be available for performing the content transfer. Further, in an example, the message may be indicative of details of the access time period for the appointee to perform the content transfer.

Further, in an embodiment, a set of access control permissions may be defined for each of the pair of appointees. In an embodiment, the set of access control permissions may be defined by the first computing device 104 and stored in a corresponding record in the employee database. In an example, the set of access control permissions specifies an access time period for performing the content transfer to the air-gapped network 106. Further, in an example, the set of access control permissions may specify access control permission to the pair of appointees to access one or more security zones of the organization required for performing content transfer. Further, in an example, the set of access control specifies access control permission to the pair of appointees to access second computing device 108 internal to the air-gapped network 106 of the organization. In an embodiment, the updated employee database with the set of access control permissions may be transmitted to the second computing device 108 internal to the air-gapped network 106 using the secure channel.

Upon receiving the message for performing the content transfer and getting the access control permission, the selected appointees may procure the portable device 210 from the designated location specified in the message. In an example, the designated location may be present in any of the security zones of an organization where the system 100 may be deployed. In an example, the selected appointees may have permission to access said security zone.

Post getting the portable device 210 by the pair of appointees, in the method 300, at step 310, transferring the content to the portable device 210 for performing the content transfer to the air-gapped network 106. In an embodiment, the portable device 210 may be connected with the first computing device 104 to transfer the content to the portable device 210. In an embodiment, performing the content transfer to the air-gapped network 106 may be indicative of performing the content transfer from the first computing device 104 to the second computing device 108. In an embodiment, the second computing device 108 may be present in the air gapped network and the content transfer may be performed using the portable device 210 with the help of selected pair of appointees.

In an embodiment, the method 300 may include registering the portable device 210 as an authorized device in an authorized devices database based on a device ID associated with the portable device 210. In an embodiment, the registration may be performed at the first computing device 104. In an example, registering the portable device 210 may be performed when the portable device 210 is connected to or inserted into the first computing device 104 for the first time for transferring the content to the portable device 210. In an example, the first computing device 104 may transmit the authorized devices database to the second computing device 108 using the secure channel.

When the portable device 210 may be inserted into or connected to the second computing device 108 internal to the air gapped network for performing the content transfer, said portable device 210 may get authenticated at the second computing device 108. In an embodiment, the method 300 includes authenticating the portable device 210 based on the device ID of the portable device 210 and the authorized devices database. In an embodiment, the second computing device 108 may approve the portable device 210 for use in the air-gapped network 106 if the authentication of the portable device 210 may deem successful.

Further, in an embodiment, the second computing device 108 may restrict the portable device 210 for use in the air-gapped network 106 if the authentication of the portable device 210 may deem unsuccessful. In an embodiment, in the method 300, a message may be sent indicative that content transfer may not be performed due to unsuccessful verification of the portable device 210. In an example, the message may be sent to the first computing device 104 from the second computing device 108.

Subsequent to the authentication of the portable device 210, the method 300, at 312, includes performing a verification of the pair of appointees based upon corresponding records of the pair of appointees stored in the employee database. In an example, the employee database may be stored in the second storage 208 of the second computing device 108. In an embodiment, the verification of the pair of appointees may be performed at the second computing device 108 internal to the air-gapped network 106. In an embodiment, verifying of the pair of appointees by the second computing device 108 may include performing a facial match in real-time based on the corresponding record for each of the pair of appointees.

In an embodiment, if the facial verification is unsuccessful for either of the two appointees, the method 300 may not proceed to subsequent steps of performing the content transfer. In an embodiment, in the method 300, a message may be sent indicative that content transfer may not be performed due to unsuccessful verification of the either of the two appointees. In an example, the message may be sent to the first computing device 104 from the second computing device 108.

Further, in an embodiment, once the facial verification is successful, the method 300 may include determining whether a request for transferring the content to the storage is received within the accessible time period based on the corresponding record. In an example, said step of determining may be performed at the second computing device 108 internal to the air gapped network. In an example, the accessible time period may be retrieved from the updated employee database present in the second storage 208 of the second computing device 108. In an example, the time when the portable device 210 was inserted may be retrieved from a device manager or timestamps in the registry of the second computing device 108. In an embodiment, for performing the determining step, the time of request for content transfer may be checked whether the same is falling within the accessible time period. Further, in an embodiment, the storage may be the second storage 208 in the second computing device 108.

In an example, the accessible time period may be specified in the set of access control permissions granted to the pair of appointees for performing the content transfer to the air-gapped network 106. Further, the set of access control permissions for each of the pair of appointees may be stored in a corresponding record in the employee database. In an embodiment, the updated employee database may be transmitted from the first computing device 104 to the second computing device 108 deployed inside the air-gapped network 106 using the secure channel.

In an embodiment, in the method 300, if the request for transferring the content to may not be received within the accessible time period based on the corresponding record a message may be sent indicative that content transfer may not be performed as the request for content transfer may be received beyond the accessible time period. In an example, the message may be sent to the first computing device 104 from the second computing device 108.

Further, in the method 300, at step 314, a second set of operations on the content for verifying the content may be performed, when the verification of the pair of appointees is successful. In an embodiment, the second set of operations on the content for verifying the content may be performed when the request for transferring the content to the storage may not be received within the accessible time period. In an embodiment, the second set of operations on the content may be performed to check whether the content received from the first computing device 104 via the portable device 210 have any malicious content. Further, in an embodiment, the second set of operations may be performed to verify the content received from the first computing device 104 via the portable device 210 followed by checking the content for the malicious content. In an example, the second set of operations may be performed using at least the second computing device 108 internal to the air-gapped network 106.

Lastly, the method 300, at the step 316, permitting transfer of the content from the portable device 210 to the storage in the air-gapped network 106 when the content is successfully verified based on the second set of operations. In an example, the storage may be a second storage 208 present in the second computing device 108. In an embodiment, in the method 300, if the content verification is unsuccessful, a message may be sent indicative that content transfer may not be performed as the content verification is unsuccessful. In an example, the message may be sent to the first computing device 104 from the second computing device 108.

Figure 4:
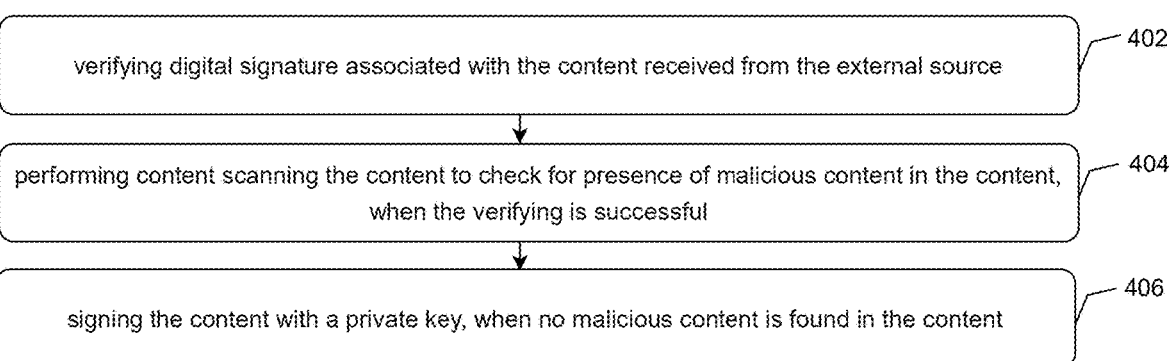
FIG. 4 illustrates a flowchart of a method of content transfer to an air-gapped network, according to one or more embodiments of the present disclosure.

FIG. 4 illustrates a flowchart of a method 400 of content transfer to an air-gapped network, according to one or more embodiments of the present disclosure. In an embodiment, the method 400 may be performing the first set of operations on the content received from an external source, according to one or more embodiments of the present disclosure. The steps of the method 400, described in connection with the embodiments disclosed herein, may be embodied directly in hardware, in firmware, in a software module executed by the system 100, or in any practical combination thereof.

When the content is received from the external source at the environment, the content may be delivered to a first computing device 104 of the system 100. The first set of operations may be performed on the content so as to check if the content has any malicious content. In an embodiment, the first set of operations include verification of digital signature associated with the content, performing content scanning and signing of the content with the keys for securing the content.

At step 402, digital signature associated with the content received from the external source may get verified. In an embodiment, said step of verification of the content may be performed at the first computing device 104 present in the network 102 external to the air-gapped network 106.

In an embodiment, if the digital signature verification is unsuccessful, the method 400 may not proceed to subsequent steps of content scanning. In an embodiment, the first computing device 104 may restrict the content for further processing and transmitting to the air-gapped network 106.

At step 404, performing content scanning the content to check for presence of malicious content in the content, when the verifying is successful. In an embodiment, said step of content scanning may be performed at the first computing device 104 present in the network 102 external to the air-gapped network 106.

In an embodiment, if the content scanning is unsuccessful, the method 400 may not proceed to subsequent steps of signing the content with the keys. In an embodiment, the first computing device 104 may restrict the content for further processing and transmitting to the air-gapped network 106.

At step 406, signing the content with a private key, when no malicious content is found in the content. In an embodiment, the private key and a public key may form a key pair. In an embodiment, the key pair may be generated at the first computing device 104 periodically wherein the private key may be used to sign the content and the public key may be used to verify the signed content. In an embodiment, generated private key may be stored in a first storage 204 in the first computing device 104. Further, in an embodiment, once the key pair is generated or updated at the first computing device 104, the first computing device 104 may transmit the public key associated with the key pair to the second computing device 108 through a secure channel.

In an embodiment, said step of signing the content may be performed at the first computing device 104 present in the network 102 external to the air-gapped network 106. In an embodiment, signing the content with the private key may indicate that the content has been secured at the first computing device 104. This signed content may be later verified at the second computing device 108 using the public key during the content transfer. The second computing device 108 is internal to the air-gapped network 106. In an embodiment, the first computing device 104 external to the air-gapped network 106 and the second computing device 108 internal to the air-gapped network 106 may form part of the system 100, wherein the system is deployed in the environment to ensure that no malicious content may get transferred to one or more systems or the plurality of third computing devices 110 present in the air-gapped network 106.

Figure 5:
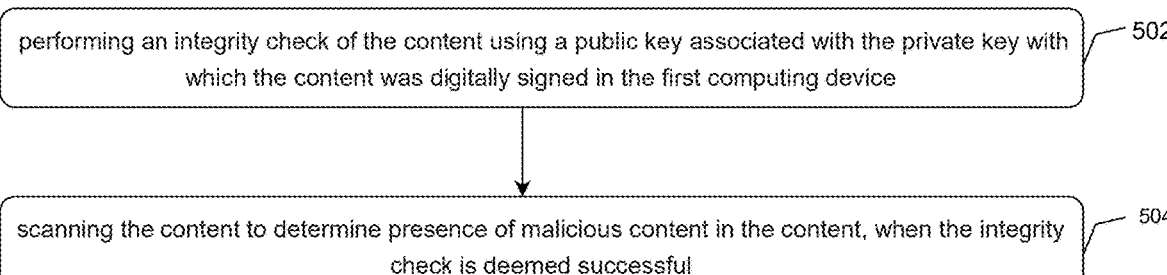
FIG. 5 illustrates a flowchart of a method of content transfer to an air-gapped network, according to one or more embodiments of the present disclosure.

FIG. 5 illustrates a flowchart of a method 500 of content transfer to an air-gapped network, according to one or more embodiments of the present disclosure. In an embodiment, the method 500 may be performing the second set of operations on the content received from an external source, according to one or more embodiments of the present disclosure. The steps of the method 400, described in connection with the embodiments disclosed herein, may be embodied directly in hardware, in firmware, in a software module executed by the system 100, or in any practical combination thereof. In an embodiment, the second set of operations includes performing an integrity check of the content and the content scanning to determine presence of malicious content in the content.

The method 500, at 502, performing an integrity check of the content using a public key associated with a private key with which the content was digitally signed in the first computing device 104. In an embodiment, integrity check may be performed at the second computing device 108. In an embodiment, the integrity check may be performed on the content when there is an attempt made to transfer the content to the second computing device 108 from the from the first computing device 104 through portable device 210.

In an embodiment, the public key may be retrieved from the second storage 208 for verifying the content. In an example, the content was digitally signed in the first computing device 104 for securing the content with a private key and public key may be used to verify the content which was signed by its corresponding private key at the second computing device 108. In an embodiment, the private key and the public key may form a key pair. In an embodiment, the key pair may be generated at the first computing device 104 periodically. In an embodiment, once the key pair is generated or updated at the first computing device 104, the first computing device 104 may transmit the public key associated with the key pair to the second computing device 108 through a secure channel. The public key may be stored in the second storage 208 in the second computing device 108.

In case of failure of the integrity check, the second processor 206 may restrict the content transfer from the inserted portable device 210 to the second computing device 108 in the air-gapped network 106. In an embodiment, in the method 500, in case of failure of the integrity check, a message may be sent indicative that content transfer may not be performed as the content verification is unsuccessful. In an example, the message may be sent to the first computing device 104 from the second computing device 108.

The method 500, at 504, perform the scanning the content to determine presence of malicious content in the content, when the integrity check is deemed successful. In an embodiment, the scanning of the content may be performed at the second computing device 108. In an embodiment, scanning the content may be done to determine presence of malicious content in the content received from the portable device 210. In an example, the malicious content may be viruses, malware, or exploits. In an embodiment, the content scanning may be performed using a combination of one or more techniques to detect potential threats like malware, viruses, and malicious scripts. In an example, the content scanning may be performed using heuristic analysis to identify suspicious patterns that resemble malware behaviour. Further, in an example, the content scanning may be performed using behavioural analysis, running the content in a controlled environment or sandbox to observe if it performs any harmful actions. Further, in an example, the content scanning may be performed using machine learning models to analyse the content by comparing it to previously detected threats, providing a higher level of detection for emerging or previously unknown malware. In an example, the second processor 206 may have may have antivirus software, email security systems, or web gateways for performing the content scanning.

Further, in an embodiment, when the content is successfully verified based on the second set of operations, the second processor 206 may permit transfer of the content from the portable device 210 to the second storage 208 in the air-gapped network 106. Subsequently, the content may be transferred to the intended devices from amongst the plurality of devices 110 in the air gapped network.

In case the content scanning is unsuccessful, the second processor 206 may restrict the content transfer from the inserted portable device 210 to the second computing device 108 in the air-gapped network 106. In an embodiment, in the method 500, if the content verification is unsuccessful, a message may be sent indicative that content transfer may not be performed as the content verification is unsuccessful. In an example, the message may be sent to the first computing device 104 from the second computing device 108.

Figure 6:
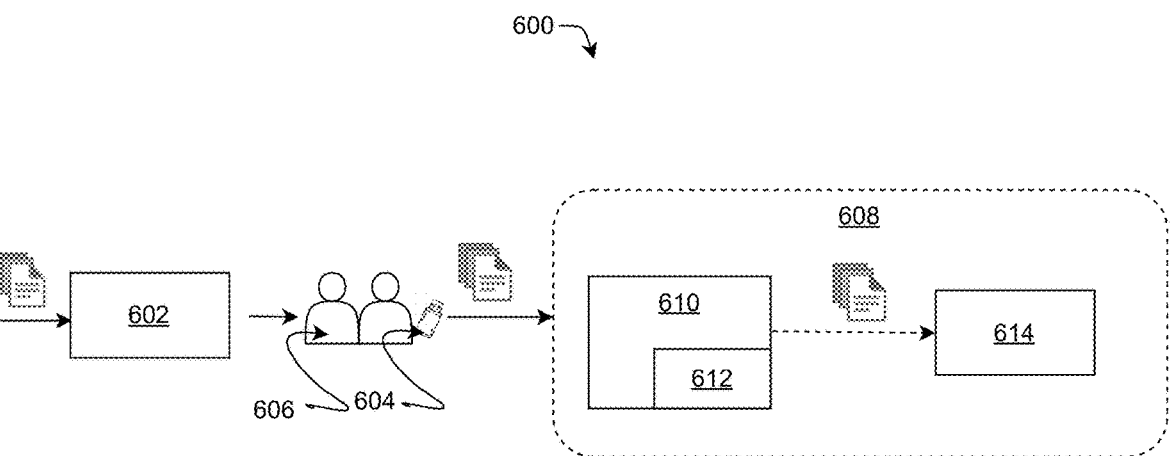
FIG. 6 illustrates a use case example of performing content transfer to an air-gapped network, according to one or more embodiments of the present disclosure.

FIG. 6 illustrates a use case 600 depicting implementation of the system 100, according to some embodiments of the present disclosure. The use case 600 illustrates an environment which may be a university implementing the system 100, a first computing device 602, portable device 604, a second computing device 610, a storage 612 and a third computing device 614 where the second computing device 610 and the third computing device 614 are present in an air-gapped network 608. In an example, the first computing device 602 may be outside the air-gapped network 608. In an example, the first computing device 602 and the second computing device 610 forms part of the system 100 to enable content transfer, ensuring that no malicious content is introduced into the third computing device 614 or any other system (not shown in the figure) within the air-gapped network.

In an example, the system 100 may be implemented in the university to enable content transfer received from any external source to the systems or commuting devices present in the air-gapped network of the university, ensuring that no malicious content is introduced into third computing device 614 or any other system present within the air-gapped network of the university. According to system 100, when a file is received from an external source in the environment, it may not be directly sent to the systems or computing devices present in the air-gapped network 608. The file may be received at the first computing device 602 external to the air-gapped network 608. Said device 602 may perform a first set of operations on the file to check whether the file is present with any malicious content. Further, the first computing device 602 may randomly select pair of approvers and pair of appointees from the employees of the environment for performing the transfer of the file from the first computing device 602 to the air-gapped network 608. The first computing device 602 may have the database of the employees working in the environment for performing the selection of the appointees and approvers. The first computing device 602 may then send request to the pair of approvers to provide approval on the pair of appointees to perform the content transfer. Upon receiving the approval from the pair of approvers, the first computing device 602 may send message to the pair of appointees to perform the file transfer. The first computing device 602 may also access details, access time interval, details related to the portable device 604 to the pair of appointees separately.

The pair of appointees 606 may then procure the portable device 604 from a secure location within the environment. Then, the pair of appointees 606 insert the portable device 604 into the first computing device 602 to save the file into the portable device 604 that has already been verified and secured at the first computing device 602. Further, when inserted or connected, the first computing device 602 registers the portable device 604 into its record and securely transmit the database related to the portable device 604 to the second computing device 610 through a secure channel not shown in the FIG. 600.

The pair of appointees 606 will eventually perform the content transfer to the second computing device 610 through the portable device 604. When the portable device 604 is inserted into or connected to the second computing device 610 internal to the air-gapped network 608, a verification of the pair of appointees 606 may be performed at the second computing device 610. Further, verification of the portable device 604 may also be performed at the second computing device 610 based upon the database shared by the first computing device 602. Post successful verification of the pair of appointees 606 and the portable device 604, second set of operations may be performed on the file for verifying the content of the file at the second computing device 610.

Further, when the file is successfully verified based on the second set of operations at the second computing device 610, said device 610 may permit the transfer of the file from the portable device 604 to the storage 612 in the air-gapped network. Later on, the verified file may be transferred to the intended third computing device 614 present within the air-gapped network 608. The proposed system 100 ensured that file transmitted to the devices or systems within the air-gapped network do not have any malicious content.

The proposed solution may provide a secure way of transferring data into an air-gapped network. Some embodiments of the proposed solution may result into avoiding insider attacks and prevent the malicious file propagation into the environment. Further in some embodiments, random selection of two approvers and two appointees avoids malicious activity done by a single appointee which may be performing the content transfer to the air gapped network. Said random selection of the pair of appointees or pair of approvers may assumed as the security design principle of "separation of duties" which is the concept of requiring at least two individuals necessary for the completion of a task. Further, in some embodiments, the pair of approvers as well as pair of appointees may allow strict control over authorization and adherence to separation of duties. This may avoid the insider threat efficiently because the probability of two appointees becoming attackers is very minimal.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of content transfer to an air-gapped network (106) with no malicious content is introduced within the air-gapped network, the method comprising:

performing, using at least a first computing device (104) external to the air-gapped network (106), a first set of operations on the content received from an external source;

selecting, using a random sampling technique, a pair of approvers and a pair of appointees from an employee database associated with the air-gapped network (106);

transmitting an approval request to a corresponding device of each of the pair of approvers;

receiving an approval response from the corresponding device of each of the pair of approvers;

transferring the content to a portable device (210) for performing the content transfer to the air-gapped network (106), when the approval response indicates that the pair of appointees are approved for performing the content transfer to the air-gapped network (106);

performing, using at least a second computing device (108) internal to the air-gapped network (106), a verification of the pair of appointees based upon corresponding records of the pair of appointees stored in the employee database;

performing, a second set of operations on the content for verifying the content, when the verification of the pair of appointees is successful; and permitting transfer of the content from the portable device (210) to a storage in the air-gapped network (106) when the content is successfully verified based on the second set of operations.

2. The method of claim 1, wherein performing the first set of operations on the content received from an external source comprises:

verifying digital signature associated with the content received from the external source;

performing content scanning the content to check for presence of malicious content in the content, when the verifying is successful; and signing the content with a private key, when no malicious content is found in the content.

3. The method of claim 1, wherein the method comprises:

defining, by the first computing device (104) for each of the pair of appointees, a set of access control permissions, wherein the set of access control permissions specifies an access time period for performing the content transfer to the air-gapped network (106); and storing the set of access control permissions for each of the pair of appointees in a corresponding record in the employee database.

4. The method of claim 3, wherein the verifying of the pair of appointees by the second computing device (108) comprises:

for each of the pair of appointees:

performing a facial match in real-time based on the corresponding record; and determining whether a request for transferring the content to the storage is received within the accessible time period based on the corresponding record, when the facial match is successful.

5. The method of claim 1, wherein performing the second set of operations comprises:

performing an integrity check of the content using a public key associated with the private key with which the content was digitally signed in the first computing device (104); and scanning the content to determine presence of malicious content in the content, when the integrity check is deemed successful.

6. The method of claim 1, wherein the private key and the public key form a key pair, and wherein the method comprises:

generating, the key pair periodically by the first computing device (104);

storing the private key in the first computing device (104); and transmitting the public key to the second computing device (108).

7. The method of claim 1, wherein the method comprises:

registering, by the first computing device (104), the portable device (210) as an authorized device in an authorized devices database based on a device ID associated with the portable device (210);

authenticating, by the second computing device (108), the portable device (210) based on the device ID of the portable device and the authorized devices database; and approving the portable device (210) for use in the air-gapped network (106) when the authenticating is deemed successful.

8. A system (100) for secure content transfer to an air-gapped network (106), the system (100) comprising:

a first storage;

a first processor (202) provided in at least a first computing device (104) external to the air-gapped network (106), wherein the first processor (202) is coupled to the first storage;

a second storage; and a second processor (206) provided in at least a second computing device (108) internal to the air-gapped network (106), wherein the second processor (206) is coupled to the second storage, wherein:

the first processor (202) is configured to:

perform a first set of operations on the content received from an external source;

select, using a random sampling technique, a pair of approvers and a pair of appointees from an employee database associated with the air-gapped network (106);

transmit an approval request to a corresponding device of each of the pair of approvers;

receive an approval response from the corresponding device of each of the pair of approvers; and transfer the content to a portable device (210) for performing the content transfer to the air-gapped network (106), when the approval response indicates that the pair of appointees are approved for performing the content transfer to the air-gapped network (106); and the second processor (206) is configured to:

perform a verification of the pair of appointees based upon corresponding records of the pair of appointees stored in the employee database;

perform a second set of operations on the content for verifying the content, when the verification of the pair of appointees is successful; and permit transfer of the content from the portable device (210) to the storage in the air-gapped network (106) when the content is successfully verified based on the second set of operations.

9. The system (100) of claim 8, wherein for performing the first set of operations on the content received from the external source, the first processor (202) is configured to:

verify digital signature associated with the content received from the external source;

perform content scanning the content to check for presence of malicious content in the content, when the verifying is successful; and sign the content with a private key, when no malicious content is found in the content.

10. The system (100) of claim 8, wherein the first processor (202) is configured to:

define for each of the pair of appointees, a set of access control permissions, wherein the set of access control permissions specifies an access time period for performing the content transfer to the air-gapped network (106); and store the set of access control permissions for each of the pair of appointees in a corresponding record in the employee database.

11. The system (100) of claim 10, wherein for verifying the pair of appointees, the second processor (206) is configured to:

perform a facial match in real-time based on the corresponding record for each of the pair of appointees; and determine whether a request for transferring the content to the storage is received within the accessible time period based on the corresponding record, when the facial match is successful for each of the pair of appointees.

12. The system (100) of claim 8, wherein for performing the second set of operations, the second processor (206) is configured to:

perform an integrity check of the content using a public key associated with the private key with which the content was digitally signed in the first computing device (104); and scan the content to determine presence of malicious content in the content, when the integrity check is deemed successful.

13. The system (100) of claim 8, wherein the private key and the public key form a key pair, and wherein the first processor (202) is configured to:

periodically generate the key pair;

store the private key in the first storage; and transmit the public key to the second computing device (108).

14. The system (100) of claim 8, wherein:

the first processor (202) is configured to register the portable device (210) as an authorized device in an authorized devices database based on a device ID associated with the portable device (210); and the second processor (206) is configured to:

authenticate the portable device (210) based on the device ID of the portable device and the authorized devices database; and approve the portable device (210) for use in the air-gapped network (106) when the authenticating is deemed successful.

15. A computer-readable medium having computer-executable instructions stored thereon that, when executed by a processing system, cause the processing system to:

perform a first set of operations on the content received from an external source wherein the verification is performed using at least a first computing device (104) external to the air-gapped network (106);

select, using a random sampling technique, a pair of approvers and a pair of appointees from an employee database associated with the air-gapped network (106);

transmit an approval request to a corresponding device of each of the pair of approvers;

receive an approval response from the corresponding device of each of the pair of approvers;

transfer the content to a portable device (210) for performing the content transfer to the air-gapped network (106), when the approval response indicates that the pair of appointees are approved for performing the content transfer to the air-gapped network (106);

perform a verification of the pair of appointees based upon corresponding records of the pair of appointees stored in the employee database, wherein the verification is performed using at least a second computing device (108) internal to the air-gapped network (106);

perform a second set of operations on the content for verifying the content, when the verification of the pair of appointees is successful; and permit transfer of the content from the portable device (210) to a storage in the air-gapped network (106) when the content is successfully verified based on the second set of operations.

16. The computer-readable medium of claim 15, wherein the computer-executable instructions cause the processing system to:

verify digital signature associated with the content received from the external source;

perform content scanning the content to check for presence of malicious content in the content, when the verifying is successful; and sign the content with a private key, when no malicious content is found in the content.

17. The computer-readable medium of claim 16, wherein the computer-executable instructions cause the processing system to:

define for each of the pair of appointees, a set of access control permissions, wherein the set of access control permissions specifies an access time period for performing the content transfer to the air-gapped network (106); and store the set of access control permissions for each of the pair of appointees in a corresponding record in the employee database.

18. The computer-readable medium of claim 17, wherein the computer-executable instructions cause the processing system to:

perform a facial match in real-time based on the corresponding record for each of the pair of appointees; and determine whether a request for transferring the content to the storage is received within the accessible time period based on the corresponding record, when the facial match is successful for each of the pair of appointees.

19. The computer-readable medium of claim 15, wherein the computer-executable instructions cause the processing system to:

perform an integrity check of the content using a public key associated with the private key with which the content was digitally signed in the first computing device (104); and scan the content to determine presence of malicious content in the content, when the integrity check is deemed successful.

20. The computer-readable medium of claim 15, wherein the computer-executable instructions cause the processing system to:

register the portable device (210) as an authorized device in an authorized devices database based on a device ID associated with the portable device (210);

authenticate the portable device based on the device ID of the portable device and the authorized devices database; and approve the portable device (210) for use in the air-gapped network (106) when the authenticating is deemed successful.

* * * * *